United States Patent
Miyazaki et al.

(10) Patent No.: US 6,849,022 B2
(45) Date of Patent: Feb. 1, 2005

(54) AUTOMATIC TRANSMISSION

(75) Inventors: Terufumi Miyazaki, Toyota (JP); Yoshihiro Iijima, Seto (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 10/314,967

(22) Filed: Dec. 10, 2002

(65) Prior Publication Data

US 2003/0109353 A1 Jun. 12, 2003

(30) Foreign Application Priority Data

Dec. 10, 2001 (JP) ......................................... 2001-375771
Nov. 5, 2002 (JP) ......................................... 2002-321851

(51) Int. Cl.$^7$ ................................................. F16H 3/62
(52) U.S. Cl. ......................................... 475/275; 475/276
(58) Field of Search ................................. 475/275, 276

(56) References Cited

U.S. PATENT DOCUMENTS

| | | | | | |
|---|---|---|---|---|---|
| 4,872,376 | A | * | 10/1989 | Asada et al. ................. | 475/281 |
| 5,599,251 | A | * | 2/1997 | Beim et al. ................... | 475/275 |
| 5,772,552 | A | * | 6/1998 | Ibaraki et al. ................ | 475/281 |
| 5,788,596 | A | * | 8/1998 | Robinson et al. ............ | 475/271 |
| 6,422,968 | B1 | * | 7/2002 | Coffey ......................... | 475/275 |
| 6,422,969 | B1 | * | 7/2002 | Raghavan et al. ........... | 475/276 |
| 6,503,170 | B1 | | 1/2003 | Tabata | |
| 6,517,463 | B2 | | 2/2003 | Sugiura et al. | |
| 6,648,789 | B1 | * | 11/2003 | Usoro et al. ................. | 475/276 |
| 2002/0115522 | A1 | * | 8/2002 | Raghavan et al. .......... | 475/276 |
| 2002/0183160 | A1 | * | 12/2002 | Kao et al. .................... | 475/269 |

FOREIGN PATENT DOCUMENTS

| | | |
|---|---|---|
| EP | 0434525 | 6/1991 |
| JP | 2956173 | 4/1992 |
| JP | HEI04-219553 | 8/1992 |
| JP | 5-26310 | 2/1993 |
| JP | HEI08-105496 | 4/1996 |
| JP | HEI09-126283 | 5/1997 |
| JP | 2000-199549 | 7/2000 |
| JP | 2000-266138 | 9/2000 |
| JP | 2001-82555 | 3/2001 |
| JP | 2001-182785 | 7/2001 |

OTHER PUBLICATIONS

U.S. Appl. No. 10/189,449, filed Jul. 8, 2002, Pending.
U.S. Appl. No. 10/273,154, filed Oct. 18, 2002, Pending.
U.S. Appl. No. 10/314,967, filed Dec. 10, 2002, Pending.
U.S. Appl. No. 10/283,284, filed Oct. 30, 2002, Pending.
U.S. Appl. No. 10/283,262, filed Oct. 30, 2002, Pending.
U.S. Appl. No. 10/281,958, filed Oct. 29, 2002, Pending.

* cited by examiner

Primary Examiner—Saul Rodriguez
Assistant Examiner—Dennis J. Abdelnour
(74) Attorney, Agent, or Firm—Oblon, Spivak, McClelland, Maier & Neustadt, P.C.

(57) ABSTRACT

Of each rotating element of a second planetary gearset and a third planetary gearset, a first rotating element is constructed of a sun gear, a second rotating element is constructed of connected ring gears, a third rotating element is constructed of connected carriers, and a fourth rotating element is constructed of a sun gear. The first rotating element is connected to a case by a brake, the second rotating element is connected to the case by a brake, the fourth rotation element is connected to an input shaft via a clutch, the second rotation element is connected to the input shaft via a clutch, the first rotating element is integrally connected to a ring gear of a first planetary gearset, a third rotating element is integrally connected to an output gear, and six forward speeds from a first speed "1st" to a sixth speed "6th", and a reverse speed "Rev" are achieved according to an operation table.

7 Claims, 4 Drawing Sheets

| | C1 | C2 | B1 | B2 | B3 | F | GEAR RATIO | STEP |
|---|---|---|---|---|---|---|---|---|
| 1st | O | | | ◎ | | O | 3.62 | |
| 2nd | O | | O | | | | 2.07 | 1.75 |
| 3rd | O | | | | O | | 1.40 | 1.48 |
| 4th | O | O | | | | | 1.00 | 1.40 |
| 5th | | O | | | O | | 0.73 | 1.38 |
| 6th | | O | O | | | | 0.59 | 1.23 |
| Rev | | | | O | O | | 3.23 | TOTAL 6.1 |

|  | C1 | C2 | B1 | B2 | B3 | GEAR RATIO | STEP |
|---|---|---|---|---|---|---|---|
| 1st | O |  |  | O |  | 3.194 | |
| 2nd | O |  | O |  |  | 1.935 | 1.650 |
| 3rd | O |  |  |  | O | 1.433 | 1.351 |
| 4th | O | O |  |  |  | 1.000 | 1.433 |
| 5th |  | O |  |  | O | 0.683 | 1.465 |
| 6th |  | O | O |  |  | 0.574 | 1.190 |
| Rev |  |  |  | O | O | 3.586 | TOTAL 5.568 |

US 6,849,022 B2

AUTOMATIC TRANSMISSION

INCORPORATION BY REFERENCE

The disclosure of Japanese Patent Application No. 2001-375771 filed on Dec. 10, 2001 including the specification, drawings and abstract are incorporated herein by reference in their entirety.

BACKGROUND OF THE INVENTION

1. Field of the Invention

This invention relates to an automatic transmission, and more particularly, an automatic transmission with a small number of clutches, which enables multiple speeds.

2. Description of the Related Art

A plurality of planetary gearsets, clutches, and brakes are often used as an automatic transmission for a vehicle. The automatic transmission disclosed in Japanese Patent Laid-Open Publication No. 2000-199549 is one example of an automatic transmission in which three pairs of the planetary gearsets, three clutches, and two brakes enable six forward speeds.

However, because a clutch rotates, a drum, a seal ring, and a centrifugal hydraulic pressure balance mechanism in a cylinder chamber and the like are required. In addition, the weight and cost of clutches is more than those of brakes. The clutch is also disadvantageous in terms of a shaft length of the transmission.

SUMMARY OF THE INVENTION

In view of the foregoing problems, it is an object of the invention to enable six forward speeds with two clutches.

In order to achieve the foregoing object, according to one aspect of an automatic transmission of the invention, there is provided an input member which transmits rotation to the automatic transmission; a first planetary gearset in which one of three rotating elements, which are a sun gear, a ring gear, and a carrier, is connected to the input member and rotatably driven, then one of the other rotating element is selectively stopped from rotating such that the one remaining rotating element decelerates and outputs rotation as an intermediate member with respect to the rotation of the input member; a second planetary gearset and a third planetary gearset that include a first, second, third and fourth rotating elements which are integrally connected to the intermediate output member by portions of the sun gear, carrier, and ring gear being connected to together; a first stop portion that selectively stops the first rotating element from rotating; a second stop portion that selectively stops the second rotating element from rotating; a third stop portion that selectively stops the other rotating element from rotating; a first connection portion that selectively connects the input member and the fourth rotating element; a second connection portion that selectively connects the input member and the second rotating element; and an output member which transmits the rotation from the third rotating element.

According to the automatic transmission of the invention constructed as above, the six forward speeds are achieved by three pairs of planetary gearsets, two clutches, and three brakes. As a result, weight, cost, and shaft length can be reduced by the amount corresponding to the number of fewer clutches compared to when three clutches and two brakes are used.

DETAILED DESCRIPTION OF PREFERRED EMBODIMENTS

Figures 1A, 1B:
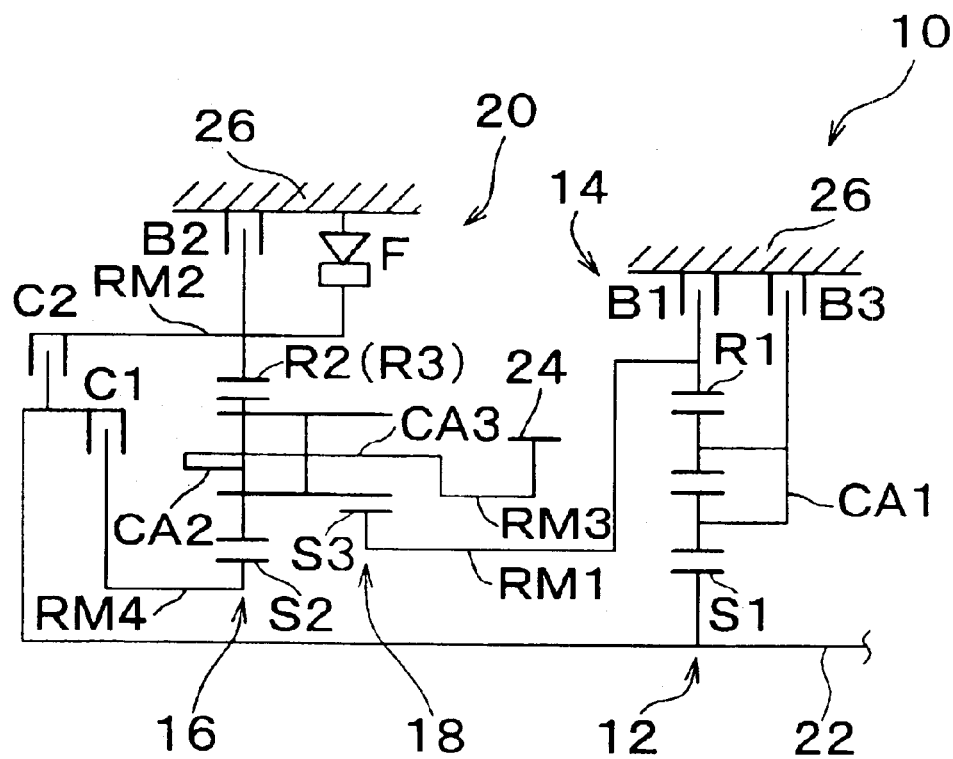
FIG. 1 is a view explaining an automatic transmission for a vehicle which is one embodiment of the invention, with FIG. 1A being a skeleton view and FIG. 1B being an operation table for achieving each speed.

The invention is preferably applied to an automatic transmission for a vehicle. In this invention, for example, rotation is input from a power source for driving, such as an internal combustion engine or the like, through a fluid coupling such as a torque converter or the like. The speed of that rotation is then changed with a predetermined gear ratio, and transmitted to right and left driven wheels from an output member such as an output gear, an output shaft, or the like, through a differential gearset. Hereafter, an embodiment of the invention will be described in detail referring to the drawings.

The gear ratio is a ratio of the rotational speed of the input member to the rotational speed of the output member (it is equal to the rotational speed of the input member divided by the rotational speed of the output member).

FIG. 1A is a skeleton view of the automatic transmission 10 for a vehicle according to one embodiment of the invention. FIG. 1B is an operation table illustrating engagement elements and the gear ratios when a plurality of speeds are achieved. This automatic transmission 10 for a vehicle is for FF (front engine and front drive) vehicles and the like having a transversely mounted engine. A first transmitting portion 14 and a second transmitting portion 20 are disposed on the same axial line, and change the rotational speed of an input shaft 22, after which they output that rotation from an output gear 24. The first transmitting portion is mainly constructed of a double pinion type first planetary gearset 12. In addition, the second transmitting portion is mainly constructed of a single pinion type second planetary gearset 16 and a double pinion type third planetary gearset 18.

The input shaft 22 is equivalent to the input member and is, for example, a turbine shaft of the torque converter which is rotatably driven by a power source for driving such as an engine. The output gear 24 is equivalent to the output member, and rotatably drives right and left wheels through the differential gearset. The automatic transmission 10 for a vehicle is constructed substantially symmetrical with respect to a center line. The half below the center line is omitted in FIG. 1A. This also applies to the following embodiment.

The first planetary gearset 12 that is included in the first transmitting portion 14 is provided with three rotating elements: a sun gear S1, a carrier CA1, and a ring gear R1. The sun gear S1 is connected to the input shaft 22, and rotatably driven, while the carrier CA1 is fixed, so as not to rotate, to a case 26 via a third brake B3, such that the ring gear R1 decelerates and outputs rotation as an intermediate output member with respect to the input shaft 22. Moreover, the second planetary gearset 16 and the third planetary gearset 18 that are included in the second transmitting portion 20 are constructed of four rotating elements, RM1 through RM4, by portions of each gearset being connected together. Specifically, the first rotating element is constructed of the sun gear S3 of the third planetary gearset 18. In addition, the second rotating element RM2 is constructed of the ring gear R2 of the second planetary gearset 16 and the ring gear R3 of the third planetary gearset 18, connected to one another. Further, the third rotating element RM3 is constructed of the carrier CA2 of the second planetary gearset 16 and the carrier CA3 of the third planetary gearset 18, connected to one another. Then, the fourth rotating element RM4 is constructed of the sun gear S2 of the second planetary gearset 16. In the second planetary gearset 16 and the third planetary gearset 18, the carriers CA2 and CA3, as well as the ring gears R2 and R3, respectively, are constructed of a common member. In addition, the second planetary gearset 16 and the third planetary gearset 18 are constructed with the carriers CA2 and CA3 and ring gears R2 and R3 each being common members, and make up a Ravigneaux type gear train in which a pinion gear of the second planetary gearset 16 also serves as a pinion gear of the third planetary gearset 18.

The first rotating element RM1 (sun gear S3) is selectively connected to the case 26 and is stopped from rotating by a first brake B1. The second rotating element RM2 (ring gears R2 and R3) is selectively connected to the case 26 and is stopped from rotating by a second brake B2. The fourth rotating element RM4 (sun gear S2) is selectively connected to the input shaft 22 via a first clutch C1. The second rotating element RM2 (ring gears R2 and R3) is selectively connected to the input shaft 22 via a second clutch C2. The first rotating element RM1 (sun gear S3) is integrally connected to the ring gear R1 of the first planetary gearset 12 which is the intermediate output member. The third rotating element RM3 (carriers CA2 and CA3) is integrally connected to the output shaft 24 and outputs rotation.

Each of the first brake B1, the second brake B2, the third brake B3, the first clutch C1, and the second clutch C2 is a multiple disc type hydraulic friction device which engages frictionally using a hydraulic cylinder. Moreover, a one-way clutch F is provided in parallel with the second brake B2 between the rotating element RM2 and the case 26 for allowing positive rotation (i.e., in the same rotation direction as that of the input shaft 22) of the second rotating element RM2 and inhibiting the reverse rotation.

Figure 2:
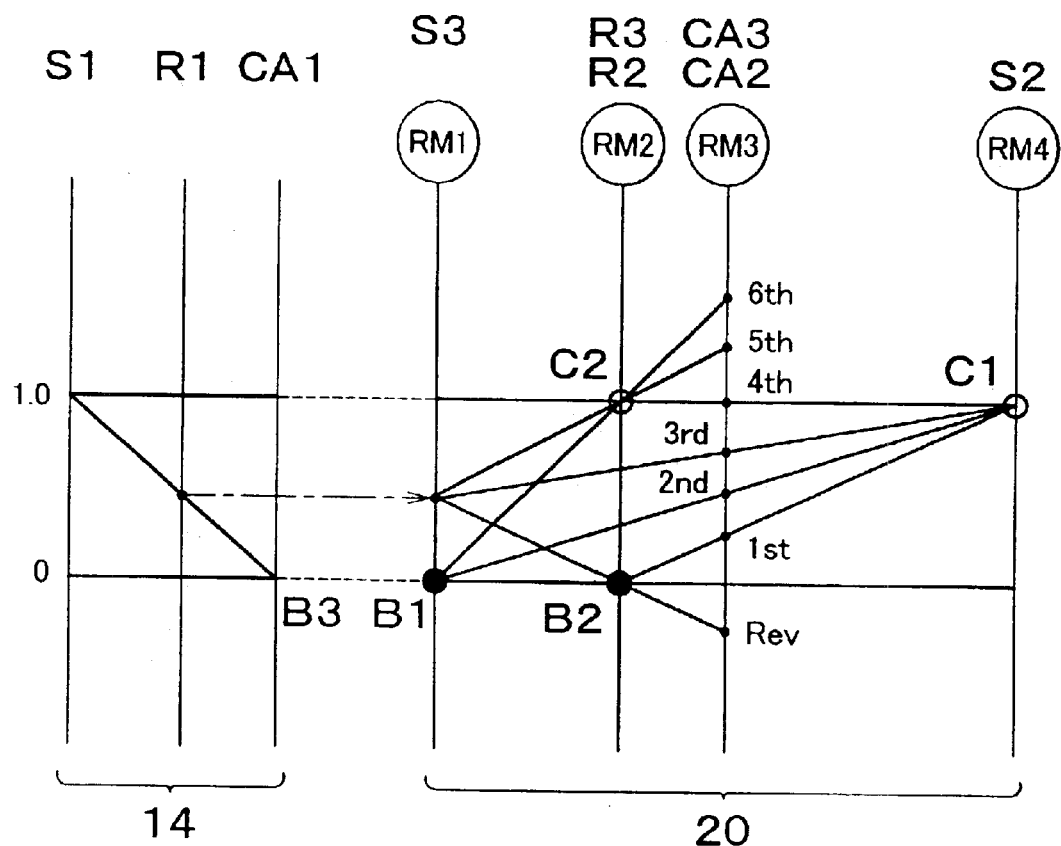
FIG. 2 is an alignment graph of the embodiment in FIG. 1.

FIG. 2 is an alignment graph showing the rotational speed of each rotating element in the first transmitting portion 14 and the second transmitting portion 20 in a straight line. The lower horizontal line represents the rotational speed "0" while the upper horizontal line represents the rotational speed "1.0", which is the same speed of the input shaft 22. In addition, vertical lines of the first transmitting portion 14 denotes the sun gear S1, the ring gear R1, and the carrier CA1, respectively, from left to right. The distance between these is determined according to a gear ratio ρ1 of the first planetary gearset 12 (ρ1 is equal to the number of teeth on the sun gear divided by the number of teeth on the ring gear). Four vertical lines of the second transmitting portion 20 show the rotating element RM1 (sun gear S3), the second rotating element RM2 (ring gears R2 and R3), the third rotating element RM3 (carriers CA2 and CA3), and the fourth rotating element (sun gear S2), respectively, from left to right in the figure. The distance between these is determined according to a gear ratio ρ2 of the second planetary gearset 16 and a gear ratio ρ3 of the third planetary gearset 18.

It is evident from the alignment graph that when the first clutch C1 and the second brake B2 are engaged, the fourth rotating element RM4 is integrally rotated with the input shaft 22, and the second rotating element RM2 is stopped from rotating, the third rotating element RM3 connected to the output gear 24 is rotated at the rotational speed shown by "1st". The first speed "1st" achieved here is the largest gear ratio.

When the first clutch C1 and the first brake B1 are engaged, the fourth rotating element RM4 is integrally rotated with the input shaft 22, and the first rotating element RM1 is stopped from rotating, the third rotating element RM3 is rotated at the rotational speed shown by "2nd". The second speed "2nd" achieved here is a smaller gear ratio than the first speed "1st".

When the first clutch C1 and the third brake B3 are engaged, the fourth rotating element RM4 is integrally rotated with the input shaft 22, and the first rotating element RM1 decelerates via the first transmitting portion 14, the third rotating element RM3 is rotated at the rotational speed shown by "3rd". The third speed "3rd" achieved here is a smaller gear ratio than the second speed "2nd".

When the first clutch C1 and the second clutch C2 are engaged, and the second transmitting portion 20 is integrally rotated with the input shaft 22, the third rotating element RM3 is rotated at the same rotational speed shown by "4th", that is, at the same speed as that of the input shaft 22. The fourth speed "4th" achieved here is a smaller gear ratio than the third speed "3rd". The gear ratio of this fourth speed "4th" is one.

When the second clutch C2 and the third brake B3 are engaged, the second rotating element RM2 is integrally rotated with the input shaft 22, and the first rotating element RM1 decelerates via the first transmitting portion 14, the third rotating element RM3 is rotated at the speed shown by "5th". The fifth speed "5th" achieved here is a smaller gear ratio than the fourth speed "4th".

When the second clutch C2 and the first brake B1 are engaged, the second rotating element RM2 is integrally rotated with the input shaft 22, and the first rotating element RM1 is selectively stopped from rotating, the third rotating element RM3 is rotated at the speed shown by "6th". The sixth speed "6th" achieved here is a smaller gear ratio than the fifth speed "5th".

Moreover, when the second brake B2 and the third brake B3 are engaged, the second rotating element RM2 is stopped from rotating. At the same time, the first rotating element RM1 decelerates via the first transmitting portion 14. As a result, the third rotating element RM3 is rotated in a negative direction at the speed shown by "Rev" which achieves a reverse speed "Rev".

FIG. 1B is an operation table illustrating the relationship between each speed and the clutches C1 and C2, and the brakes B1 through B3. A single circle shows engagement, and a double circle shows engagement only during engine braking. The brake B2 which achieves the first speed "1st" is provided in parallel with the one-way clutch F, such that it is not necessary to engage the brake B2 when the vehicle takes off (accelerates). Moreover, the gear ratio of each speed is appropriately determined according to each gear ratio ρ1, ρ2, ρ3 of the first planetary gearset 12, the second planetary gearset 16, and the third planetary gear 18, respectively. For example, if the ρ1 is approximately equals to 0.45, ρ2 is approximately equals to 0.38, and ρ3 is approximately equals to 0.41, the gear ratio shown in FIG. 1B is obtained, and each value of the gear ratio step (i.e., the ratio of the gear ratio between respective speeds) is substantially appropriate. In addition, the total gear ratio range (=3.62/ 0.59) is large, around 6.1, and the gear ratio of the reverse speed "Rev" is appropriate. As a result, appropriate gear ratio characteristics as a whole can be obtained.

In this manner, in the automatic transmission 10 for a vehicle according to this embodiment, six forward speeds are achieved by the three pairs of the planetary gearsets 12, 16, and 18, the two clutches C1 and C2, and the three brakes B1 through B3. As a result, weight, cost, and shaft length can be reduced by the amount corresponding to the number of fewer clutches compared to when three clutches and two brakes are used.

Particularly, the single pinion type second planetary gearset 16 and the double pinion type third planetary gearset 18 which make up the second transmitting portion 20 is a Ravigneaux type gear train of planetary gears. As a result, the number of parts and the shaft length are reduced even more.

In addition, if the gear ratios ρ1, ρ2, ρ3 of the three planetary gearsets 12, 16, and 18, respectively, are within a range of approximately 0.3 to 0.6, these planetary gearsets 12, 16, and 18 can be kept relatively small (i.e., of a small diameter) while appropriate gear ratio characteristics as a whole can be obtained as shown in FIG. 1B.

Next, another embodiment according to the invention will be described. Portions in the following embodiment that are substantially common to the aforementioned embodiment shall be referred to by like reference numerals and characters, and detailed descriptions thereof will be omitted.

Figure 3:
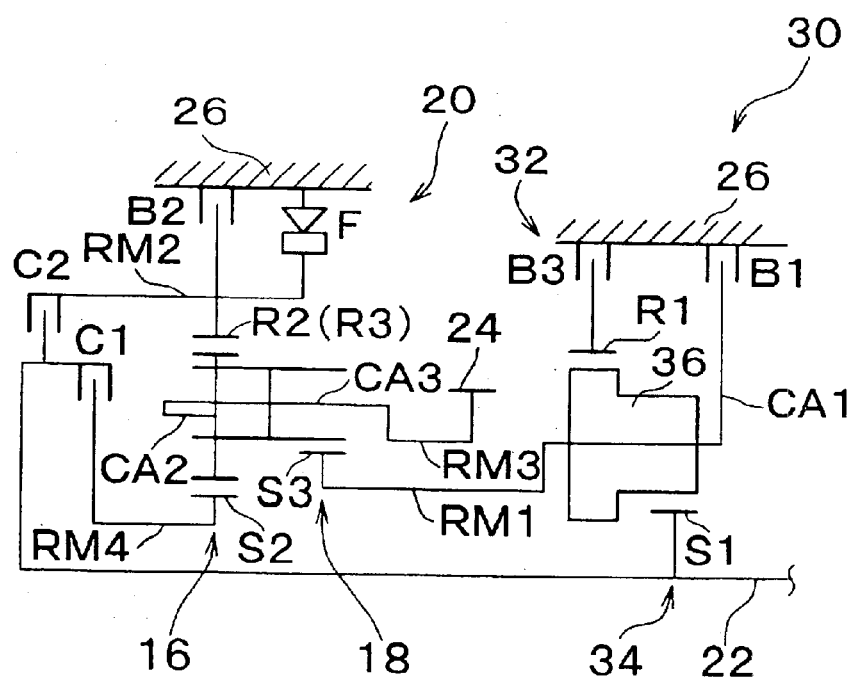
FIG. 3 is a skeleton view showing another embodiment of the invention, and which is equivalent to FIG. 1A.

FIG. 3 is a skeleton view equivalent to FIG. 1A. An automatic transmission 30 is different from the aforementioned embodiment in terms of a first transmitting portion 32. The first transmitting portion 32 is mainly constructed of a single pinion type first planetary gearset 34 which has three rotating elements: the sun gear S1, carrier CA1, and ring gear R1. However, the carrier CA1 is provided with a stepped pinion gear 36 having a large-diameter portion and a small-diameter portion. The sun gear S1 is meshed with the small-diameter portion while the ring gear R1 is meshed with the large-diameter portion. In addition, the sun gear S1 is connected to the input shaft 22, and rotatably driven, while the ring gear R1 is fixed, so as not to rotate, to the case 26 via the third brake B3 such that the carrier CA1 decelerates as an intermediate output member with respect to the input shaft 22, and outputs rotation to the first rotating element RM1 which is integrally connected to the carrier CA1.

In this automatic transmission for the vehicle 30, as well, the six forward speeds, being the first speed "1st" through the sixth speed "6th" and the reverse speed "Rev" are achieved, and the six forward speeds are achieved by the two clutches C1 and C2, and the three brakes B1 through B3, and the like, such that the same operational effect as that of the aforementioned embodiment can be obtained. In addition, the first planetary gearset 34 is constructed of the pinion gear having the stepped pinion gear 36, so there is an advantage that the rotational speed of the pinion gear 36 can be reduced.

Figures 4A, 4B:
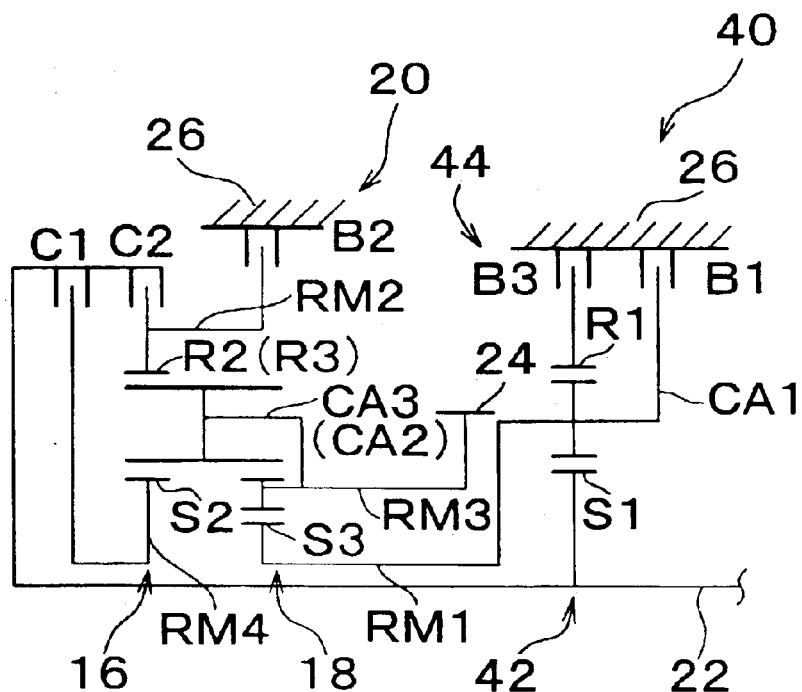
FIG. 4 is a view showing still another embodiment of the invention, and which corresponds to FIG. 1.
Figure 5:
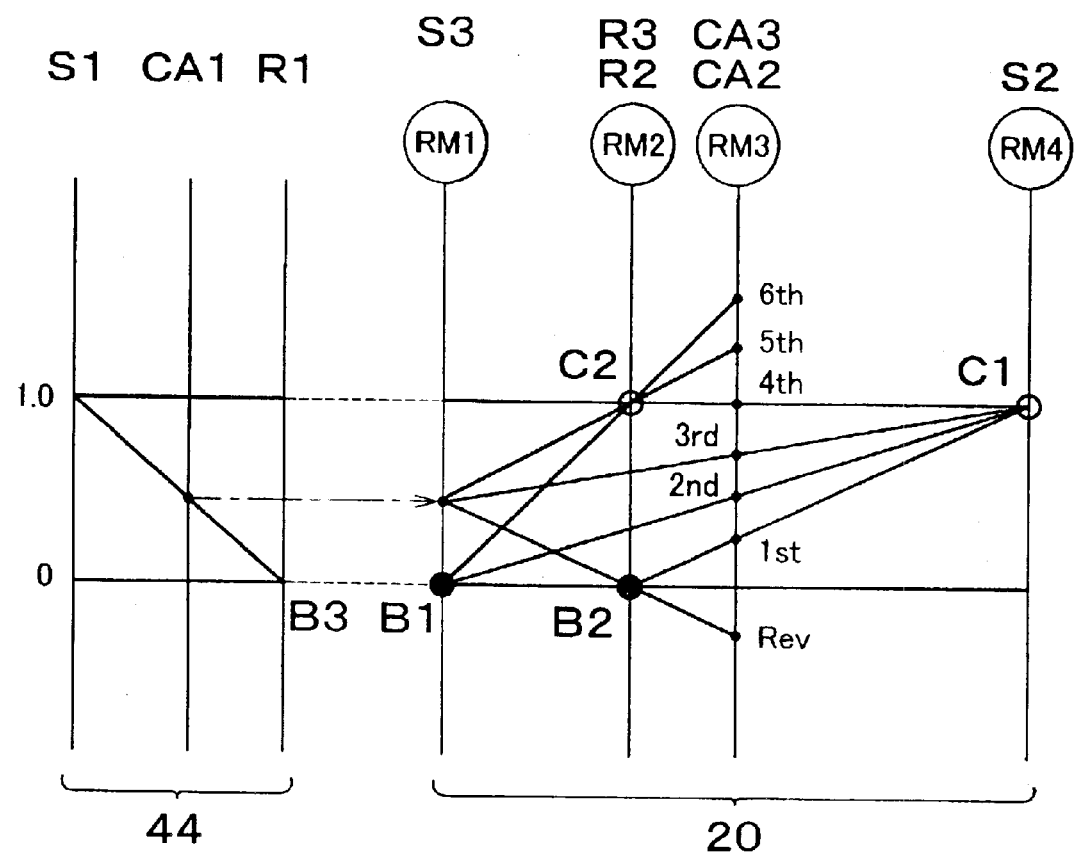
FIG. 5 is an alignment graph of the embodiment shown in FIG. 4.

FIGS. 4 and 5 are views corresponding to FIGS. 1 and 2, respectively. An automatic transmission 40 for a vehicle differs from the automatic transmission 10 for a vehicle in the following ways. That is, a first transmitting portion 44 is provided which is mainly a single pinion type first planetary gearset 42; the gear ratio ρ2 of the second planetary gearset 16 of the second transmitting portion 20 is larger than the gear ratio ρ3 of the third planetary gearset 18; and the one-way clutch F is omitted. Also, in the first planetary gearset 42, the sun gear S1 is coupled to the input shaft 22 so as to be rotatably driven thereby, and the ring gear R1 is fixed, so as not to rotate, to the case 26 via the third brake B3. Accordingly, the carrier CA1 as the intermediate output member rotates slower than the input shaft 22, and the carrier CA1 outputs rotation to the first rotating element RM1 (i.e., the sun gear S3) which is integrally connected to the carrier CA1.

In the automatic transmission 40 described above, as well, six forward speeds, being the first speed "1st" through the sixth speed "6th" and the reverse speed "Rev" are achieved as shown in the operation table in FIG. 4B. The six forward speeds are achieved by the two clutches C1 and C2, and the three brakes B1 through B3, and the like, such that the same operational effect as that of the aforementioned embodiment can be obtained. Because the one-way clutch is not provided in this embodiment, however, the first speed "1st" is achieved by engaging both the first clutch C1 and the second brake B2.

Further, the gear ratios of each of the speeds is appropriately determined according to each gear ratio ρ1, ρ2, ρ3 of the first planetary gearset 42, the second planetary gearset 16, and the third planetary gear 18, respectively. For example, if ρ1 is approximately equal to 0.600, ρ2 is approximately equal to 0.456, and ρ3 is approximately equal to 0.426, the gear ratios shown in FIG. 4B are obtained, and each value of the gear ratio steps is substantially appropriate. In addition, the total gear ratio range is large, around 5.568, and the gear ratio of the reverse speed "Rev" is also appropriate. As a result, appropriate gear ratio characteristics as a whole can be obtained.

Moreover, the gear ratios ρ1, ρ2, and ρ3 of the planetary gearsets 42, 16, and 18, respectively, are all within a range of 0.4 to 0.6. Accordingly, these planetary gearsets 42, 16, and 18 can be kept relatively small (i.e., of a small diameter), and the automatic transmission 40 for a vehicle is able to be made even more compact with the omission of the one-way clutch F.

As a preferable embodiment, if the gear ratios ρ1, ρ2, ρ3 of the three planetary gearsets, respectively, are within a range of approximately 0.3 to 0.6, these planetary gearsets can be relatively small (i.e., of a small diameter), while the gear ratios of the first speed through the sixth speed can be set appropriately.

In addition, the carriers as well as the ring gears of the single pinion type second planetary gearset and the double pinion type third planetary gearset are connected to one another. Therefore, by making these carriers and ring gears common such that the second planetary gearset and the third planetary gearset make up a Ravigneaux type gear train, the number of parts and the shaft length are reduced even more.

The automatic transmission may be transversely mounted, i.e., the axial line of the automatic transmission lies in the width direction of the vehicle, in a vehicle such as a FF vehicle, or it may be longitudinally mounted, i.e., the axial line of the automatic transmission lies in the longitudinal direction of the vehicle, in a vehicle such as a FR (front engine and rear drive) vehicle.

The automatic transmission may change speeds automatically according to a driving condition such as the operation amount of the accelerator or vehicle speed. Alternatively, the automatic transmission may change speeds according to a change operation by the driver (an upshift or downshift or the like). With the automatic transmission in the invention, six forward speeds are possible, and the reverse speed is also possible by engaging the second brake and the third brake.

As the first planetary gearset that is included in the first transmitting portion, a single pinion type or double pinion type planetary gearset provided with the sun gear, the carrier, and the ring gear is preferably used.

If the double pinion type planetary gearset is adopted for the first planetary gearset, one of the sun gear or the carrier is connected to the input member, and the other is selectively stopped from rotating by the third brake. Then, the ring gear decelerates as the intermediate output member with respect to the input member, and outputs rotation to the second transmitting portion.

If the single pinion type planetary gearset is adopted for the first planetary gearset, one of the sun gear or the carrier is connected to the input member, and the other is selectively stopped from rotating by the third brake. Then, the carrier decelerates as the intermediate output member with respect to the input member, and outputs rotation to the second transmitting portion.

If the single pinion type planetary gearset is used, it is possible to adopt the stepped pinion gear having a large-diameter portion and a small-diameter portion as a pinion gear to be provided with the carrier.

If the pinion gear is adopted, there may be a case in which the three rotating elements are constructed of the sun gear, the ring gear, and the carrier, with the sun gear being meshed with the small-diameter portion and the ring gear being meshed with the large-diameter portion, or vice versa.

Moreover, there may be a case in which the three rotating elements are constructed of a small-diameter sun gear, a large-diameter sun gear, and a carrier, in which the small-diameter sun gear meshes with the large-diameter portion of the pinion gear and the large-diameter sun gear meshes with the small-diameter portion of the pinion gear.

In addition, there may be a case in which the three rotating elements are constructed of a large-diameter ring gear, a small-diameter ring gear, and a carrier, in which the large-diameter ring gear meshes with the large-diameter portion of the pinion gear and the small-diameter ring gear is connected to the small-diameter portion of the pinion gear.

When the small-diameter sun gear, the large-diameter sun gear, and the carrier are provided, one of the small-diameter sun gear and the carrier is connected to the input member, and the other is selectively stopped from rotating by the third brake. Then, the large-diameter sun gear decelerates as the intermediate output member with respect to the input member and outputs rotation to the second transmitting portion.

Moreover, when the large-diameter ring gear, the small-diameter ring gear, and the carrier are provided, one of the large-diameter ring gear and the carrier is connected to the input member, and the other is selectively stopped from rotating by the third brake. Then, the small-diameter ring gear decelerates as the intermediate output member with respect to the input member and outputs rotation to the second transmitting portion.

As the first brake through the third brake, and the first and second clutches, a hydraulic friction device of a multiple disc type, single disc type, belt type, or the like, which is engaged by friction using the hydraulic cylinder is preferably used. Alternatively, however, another type of the friction device, such as an electromagnetic type or the like, may be adopted. In order to simplify the speed control, a one-way clutch is provided in parallel with these brakes and clutches. For example, if the one-way clutch is provided in parallel with the second brake, the first speed can be achieved simply by engaging the first clutch. In addition, changing to the second speed can be done simply by engaging. When the engine braking is not necessary, only one-way clutch may be provided instead of the second brake. With the one-way clutch, the same function as that of the brake can be obtained in terms of stopping the rotation. Further, other various aspects are possible such as one in which the brake and the one-way clutch connected in series are provided in parallel with the first brake.

The positional relationship between the first transmitting portion and the second transmitting portion, as well as between the second planetary gearset of the second transmitting portion and the third planetary gearset thereof, respectively, is not specifically limited. Various aspects are possible, for example, such as one in which the third planetary gearset is disposed between the first planetary gearset and the second planetary gearset. Various aspects are also possible for clutches and brakes, for example, such as one in which they are disposed concentrated on the one end portion.

When the invention is implemented, it is preferable to use the Ravigneaux type gear train of planetary gears. Alternatively, however, the carrier and the ring gear may be constructed separately and integrally connected with a connection member, or the like, or each pinion gear may be provided separately.

The second planetary gearset of the second transmitting portion is the single pinion type, and the third planetary gearset of the second transmitting portion is the double pinion type. Alternatively, however, a planetary gear train of two single pinion type planetary gearsets may be adopted, or a planetary gear train of two double pinion type planetary gearsets may be adopted. The connection structure of each rotating element in this pair of planetary gearsets may be determined accordingly.

Although the embodiment of the invention has been described in detail with reference to the drawings, it is only an embodiment. Many modifications and variations will readily occur to those skilled in the art. Accordingly, all such variations and modifications are involved within the intended scope of the invention.

What is claimed is:

1. An automatic transmission comprising:

an input member that transmits rotation to the automatic transmission, a first planetary gearset having three rotating elements comprising a sun gear, a ring gear and a carrier, wherein one of said rotating elements may be rotatably driven by being connected to the input member, and an other of said rotating elements may be selectively stopped from rotating, such that said one of said rotating elements may be decelerated and output rotation as an intermediate output member with respect to the rotation of the input member, a second planetary gearset and a third planetary gearset that include a first rotating element, a second rotating element, a third rotating element and a fourth rotating element which may be integrally connected to the intermediate output member by having portions of sun gears of the second and third planetary gearsets, carriers of the second and third planetary gearsets, and ring gears of the second and third planetary gearsets connected together, a first stop portion that selectively stops the first rotating element, a second stop portion that selectively stops the second rotating element, a third stop portion that selectively stops the other rotating element of said rotating elements of the first planetary gearset, a first connection portion that selectively connects the input member and the fourth rotating element, a second connection portion that selectively connects the input member and the second rotating element, and an output member that transmits rotation from the third rotating element, wherein a first speed, which has a largest gear ratio, is achieved by engaging engagement portions of the first connection portion and the second stop portion, a second speed, which has a smaller gear ratio than the first speed, is achieved by engaging engagement portions of the first connection portion and the first stop portion, a third speed, which has a smaller gear ratio than the second speed, is achieved by engaging engagement portions of the first connection portion and the third stop portion, a fourth speed, which has a smaller gear ratio than the third speed, is achieved by engaging engagement portions of the first connection portion and the second connection portion, a fifth speed, which has a smaller gear ratio than the fourth speed, is achieved by engaging engagement portions of the second connection portion and the third stop portion, a sixth speed, which has a smaller gear ratio than the fifth speed, is achieved by engaging engagement portions of the second connection portion and the first stop portion, and a reverse speed is achieved by engaging engagement portions of the second stop portion and the third stop portion, wherein the second planetary gearset is a single pinion gearset, the third planetary gearset is a double pinion gearset, the first rotating element is the sun gear of the third planetary gearset, the second rotating element is the ring gear of the second planetary gearset and the ring gear of the third planetary gearset, connected to one another, the third rotating element is the carrier of the second planetary gearset and the carrier of the third planetary gearset, connected to one another, and the fourth rotating element is the sun gear of the second planetary gearset.

2. The automatic transmission according to the claim 1, wherein: the second planetary gearset and the third planetary gearset are constructed by the carriers of the second and third planetary gearsets and the ring gears of the second and third planetary gearsets, each being common members, and make up a Ravigneaux gear train in which a pinion gear of the second planetary gearset also serves as a pinion gear of the third planetary gearset.

3. An automatic transmission comprising:

an input member that transmits rotation to the automatic transmission, a first planetary gearset having three rotating elements comprising a sun gear, a ring gear and a carrier, wherein one of said rotating elements may be rotatably driven by being connected to the input member, and an other of said rotating elements may be selectively stopped from rotating, such that said one of said rotating elements maybe decelerated and output rotation as an intermediate output member with respect to the rotation of the input member, a second planetary gearset and a third planetary gearset that include a first rotating element, a second rotating element, a third rotating element and a fourth rotating element which may be integrally connected to the intermediate output member by having portions of sun gears of the second and third planetary gearsets, carriers of the second and third planetary gearsets, and ring gears of the second and third planetary gearsets connected together, a first stop portion that selectively stops the first rotating element, a second stop portion that selectively stops the second rotating element, a third stop portion that selectively stops the other rotating element of said rotating elements of the first planetary gearset, a first connection portion that selectively connects the input member and the fourth rotating element, a second connection portion that selectively connects the input member and the second rotating element, and an output member that transmits rotation from the third rotating element, wherein a first speed, which has a largest sear ratio, is achieved by engaging engagement portions of the first connection portion and the second stop portion, a second speed, which has a smaller gear ratio than the first speed, is achieved by engaging engagement portions of the first connection portion and the first stop portion, a third speed, which has a smaller gear ratio than the second speed, is achieved by engaging engagement portions of the first connection portion and the third stop portion, a fourth speed, which has a smaller gear ratio than the third speed, is achieved by engaging engagement portions of the first connection portion and the second connection portion, a fifth speed, which has a smaller gear ratio than the fourth speed, is achieved by engaging engagement portions of the second connection portion and the third stop portion, a sixth speed, which has a smaller gear ratio than the fifth speed, is achieved by engaging engagement portions of the second connection portion and the first stop portion, and a reverse speed is achieved by engaging engagement portions of the second stop portion and the third stop portion, wherein:

the first planetary gearset is a double pinion gearset, one of the sun gear and the carrier of the first gearset is connected to the input member and comprises the one rotating element, the other of the sun gear and the carrier of the first planetary gearset may be selectively stopped from rotating by the third stop portion and comprises the other rotating element, and the ring gear may be decelerated and output rotation as the intermediate output member with respect to the rotation of the input member.

4. An automatic transmission, an input member that transmits rotation to the automatic transmission, a first planetary gearset having three rotating elements comprising a sun gear, a ring gear and a carrier, wherein one of said rotating elements may be rotatably driven by being connected to the input member, and an other of said rotating elements may be selectively stopped from rotating, such that said one of said rotating elements may be decelerated and output rotation as an intermediate output member with respect to the rotation of the input member, a second planetary gearset and a third planetary gearset that include a first rotating element, a second rotating element, a third rotating element and a fourth rotating element which may be integrally connected to the intermediate output member by having portions of sun gears of the second and third planetary gearsets, carriers of the second and third planetary gearsets, and ring sears of the second and third planetary gearsets connected together, a first stop portion that selectively stops the first rotating element, a second stop portion that selectively stops the second rotating element, a third stop portion that selectively stops the other rotating element of said rotating elements of the first planetary gearset, a first connection portion that selectively connects the input member and the fourth rotating element, a second connection portion that selectively connects the input member and the second rotating element, and an output member that transmits rotation from the third rotating element, wherein a first speed, which has a largest gear ratio, is achieved by engaging engagement portions of the first connection portion and the second stop portion, a second speed, which has a smaller sear ratio than the first speed, is achieved by engaging engagement portions of the first connection portion and the first stop portion, a third speed, which has a smaller gear ratio than the second speed, is achieved by engaging engagement portions of the first connection portion and the third stop portion, a fourth speed, which has a smaller gear ratio than the third speed, is achieved by engaging engagement portions of the first connection portion and the second connection portion, a fifth speed, which has a smaller gear ratio than the fourth speed, is achieved by engaging engagement portions of the second connection portion and the third stop portion, a sixth speed, which has a smaller gear ratio than the fifth speed, is achieved by engaging engagement portions of the second connection portion and the first stop portion, and a reverse speed is achieved by engaging engagement portions of the second stop portion and the third stop portion, wherein:

the first planetary gearset is a single pinion gearset, the ring gear of the first planetary gearset is connected to the input member and comprises the one rotating element, the sun gear of the first planetary gearset may be selectively stopped from rotating by the third stop portion and comprises the other rotating element, and the carrier may be decelerated and output rotation as the intermediate output member with respect to the rotation of the input member.

5. An automatic transmission an input member that transmits rotation to the automatic transmission, a first planetary gearset having three rotating elements comprising a sun gear, a ring gear and a carrier, wherein one of said rotating elements may be rotatably driven by being connected to the input member, and an other of said rotating elements may be selectively stopped from rotating, such that said one of said rotating elements may be decelerated and output rotation as an intermediate output member with respect to the rotation of the input member, a second planetary gearset and a third planetary gearset that include a first rotation element, a second rotating element, a third rotating element and a fourth rotating element which may be integrally connected to the intermediate output member by having portions of sun gears of the second and third planetary gearsets, carriers of the second and third planetary gearsets, and ring gears of the second and third planetary gearsets connected together, a first stop portion that selectively stops the first rotating element, a second stop portion that selectively stops the second rotating element, a third stop portion that selectively stops the other rotating element of said rotating elements of the first planetary gearset, a first connection portion that selectively connects the input member and the fourth rotating element, a second connection portion that selectively connects the input member and the second rotating element, and an output member that transmits rotation from the third rotating element, wherein a first speed, which has a largest gear ratio, is achieved by engaging engagement portions of the first connection portion and the second stop portion, a second speed, which has a smaller gear ratio than the first speed, is achieved by engaging engagement portions of the first connection portion and the first stop portion, a third speed, which has a smaller sear ratio than the second speed, is achieved by engaging engagement portions of the first connection portion and the third stop portion, a fourth speed, which has a smaller gear ratio than the third speed, is achieved by engaging engagement portions of the first connection portion and the second connection portion, a fifth speed, which has a smaller gear ratio than the fourth speed, is achieved by engaging engagement portions of the second connection portion and the third stop portion, a sixth speed, which has a smaller gear ratio than the fifth speed, is achieved by engaging engagement portions of the second connection portion and the first stop portion, and a reverse speed is achieved by engaging engagement portions of the second stop portion and the third stop portion, wherein:

the first planetary gearset is a single pinion gearset in which the pinion is provided with a large-diameter portion and a small-diameter portion, the large-diameter portion is meshed with the sun gear of the first gearset and the small-diameter portion is meshed with the ring gear of the first gearset, one of the sun gear of the first gearset and the ring gear of the first gearset is connected to the input member and comprises the one rotating element, the other of the sun gear and the ring gear of the first gearset may be selectively stopped from rotating by the third stop portion and comprises the other one of the rotating elements, and the carrier decelerates and outputs the rotation as an intermediate output member with respect to the rotation of the input member.

6. An automatic transmission comprising:

a first transmitting portion that includes a first planetary gearset having three rotating elements comprising a sun gear, a ring gear and a carrier, wherein one of the three rotating elements of the first planetary gearset is connected to an input member and may be rotatably driven, and wherein an other of the rotating elements may be selectively stopped from rotating by a selected stop portion, such that the one remaining rotating element may decelerate and output rotation as an intermediate member with respect to the input member, and a second transmitting portion that includes a second planetary gearset and a third planetary gearset in which four rotating elements are constructed by connecting portions of sun gears of the second and third planetary gearsets, carriers of the second and third planetary gearsets, and ring gears of the second and third planetary gearsets to one another, in which, when the four rotating elements of the second and third planetary gearsets are a first rotating element, a second rotating element, a third rotating element, and a fourth rotating element, the first rotating element of the second and third planetary gearsets may be selectively stopped from rotating by a first stop portion, the second rotating element of the second and third planetary gearsets may be selectively stopped from rotating by a second stop portion, the fourth rotating element of the second and third planetary gearsets may be selectively connected to the input member via a first connection portion, the second rotating element of the second and third planetary gearsets may be selectively connected to the input member via a second connection portion, the first rotating element of the second and third planetary gearsets may be integrally connected to the intermediate output member, and the third rotating element of the second and third planetary gearsets may be integrally connected to the output member and outputs rotation, on the same axial line, wherein:

a first speed, which has a largest gear ratio, is achieved by engaging engagement portions of the first connection portion and the second stop portion, a second speed, which has a smaller gear ratio than the first speed, is achieved by engaging engagement portions of the first connection portion and the first stop portion, a third speed, which has a smaller gear ratio than the second speed, is achieved by engaging engagement portions of the first connection portion and the selected stop portion as a third stop portion, a fourth speed, which has a smaller gear ratio than the third speed, is achieved by engaging engagement portions of the first connection portion and the second connection portion, a fifth speed, which has a smaller gear ratio than the fourth speed, is achieved by engaging engagement portions of the second connection portion and the third stop portion, and a sixth speed, which has a smaller gear ratio than the fifth speed, is achieved by engaging engagement portions of the second connection portion and the first stop portion, wherein:

the second planetary gearset is a single pinion gearset, the third planetary gearset is a double pinion gearset, the first rotating element is the sun gear of the third planetary gearset, the second rotating element is the ring gear of the second planetary gearset and the ring gear of the third planetary gearset, connected to one another, the third rotating element is the carrier of the second planetary gearset and the carrier of the third planetary gearset, connected to one another, and the fourth rotating element is the sun near of the second planetary gearset.

7. The automatic transmission according to the claim 6, wherein:

the second planetary gearset and the third planetary gearset are constructed with the carriers of the second and third planetary gearsets and ring gears of the second and third planetary gearsets, each being common members, and make up a Ravigneaux gear train in which a pinion gear of the second planetary gearset also serves as a pinion gear of the third planetary gearset.

* * * * *